(12) United States Patent
Zurian

(10) Patent No.: US 11,396,377 B1
(45) Date of Patent: Jul. 26, 2022

(54) AIRCRAFT SEATBACK COVER ATTACHMENT SYSTEM

(71) Applicant: B/E Aerospace, Inc., Winston-Salem, NC (US)

(72) Inventor: Charles Zurian, Kernersville, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/308,789

(22) Filed: May 5, 2021

(51) Int. Cl.
*B64D 11/06* (2006.01)
*B60N 2/60* (2006.01)

(52) U.S. Cl.
CPC ........ *B64D 11/0647* (2014.12); *B60N 2/6027* (2013.01)

(58) Field of Classification Search
CPC ............................ B64D 11/0647; B60N 2/067
See application file for complete search history.

(56) References Cited

U.S. PATENT DOCUMENTS

| | | | |
|---|---|---|---|
| 6,056,358 A | 5/2000 | Filippo | |
| 6,416,128 B1 * | 7/2002 | Fujii | B60N 2/6027 297/219.1 |
| 8,328,259 B2 | 12/2012 | Matsuzaki et al. | |
| 10,202,057 B2 * | 2/2019 | Makita | B60N 2/6009 |
| 10,843,602 B2 | 11/2020 | Verde et al. | |
| 2003/0132651 A1 | 7/2003 | Floriduz | |
| 2013/0062918 A1 * | 3/2013 | Itakura | B60N 2/6027 297/219.1 |
| 2015/0283929 A1 | 10/2015 | Velasco | |
| 2015/0284093 A1 * | 10/2015 | Velasco | B60N 2/5841 297/452.1 |
| 2018/0002022 A1 * | 1/2018 | Cheng | B64D 11/06 |
| 2018/0235376 A1 | 8/2018 | Hodgkinson | |
| 2020/0231074 A1 | 7/2020 | Pierce | |

FOREIGN PATENT DOCUMENTS

| | | | |
|---|---|---|---|
| DE | 10120118 A1 | 11/2002 | |
| DE | 102020106684 A1 * | 10/2020 | |
| EP | 1228962 A1 * | 8/2002 | ............... A47C 7/40 |
| EP | 2361802 B1 | 11/2013 | |
| EP | 3882151 A1 * | 9/2021 | ......... B64D 11/0647 |
| FR | 2935314 A1 * | 3/2010 | ........... B60N 2/6027 |
| GB | 2459254 A | 10/2009 | |
| GB | 2548906 A * | 10/2017 | ........... A47C 31/001 |
| KR | 1020020039293 A | 5/2002 | |
| WO | WO-2018056949 A1 * | 3/2018 | ............... B60N 2/68 |
| WO | 2019017834 A1 | 1/2019 | |

\* cited by examiner

*Primary Examiner* — Timothy J Brindley
(74) *Attorney, Agent, or Firm* — Suiter Swantz pc llo

(57) ABSTRACT

A seatback cover attachment system is disclosed. The attachment system may include a substrate configured to reversibly couple to a portion of a seatback frame. The substrate may include one or more surfaces that define a channel. The channel may be configured to receive a portion of the seatback frame. The attachment system may include a seatback cover sub-system. The seatback cover sub-system may include a dress cover. The seatback cover sub-system may include a side panel configured to couple to a portion of the substrate. The side panel may be configured to couple to one or more portions of the dress cover to form the seatback cover sub-system.

14 Claims, 18 Drawing Sheets

AIRCRAFT SEATBACK COVER ATTACHMENT SYSTEM

BACKGROUND

Seats may include components such as a seatback cover, a seatback cushion, and seatback support system. Additionally, in some designs, the seats may include additional components such as a seat pan cover, a seat pan cushion, and a seat pan support system. The components may be coupled together with one or more attachment assemblies. In addition, in select industries the build of the seat (and any included components within the build) may be required to meet guidelines and/or standards.

SUMMARY

A seatback cover attachment system is disclosed, in accordance with one or more embodiments of the present disclosure. In one embodiment, the attachment system includes a substrate, the substrate configured to reversibly couple to a portion of a seatback frame, the substrate including one or more surfaces that define a channel, the channel configured to receive a portion of the seatback frame. In another embodiment, the attachment system includes a seatback cover sub-system, the seatback cover sub-system. In another embodiment, the seatback cover sub-system includes a dress cover. In another embodiment, the seatback cover sub-system includes a side panel, the side panel configured to couple to a portion of the substrate, the side panel configured to couple to one or more portions of the dress cover to form the seatback cover sub-system.

In some embodiments, the attachment system may include one or more seams to join the side panel directly to a portion of the substrate.

In some embodiments, the substrate may include a lowered portion and a raised portion on a surface of the substrate.

In some embodiments, the raised portion may be dimensioned to obscure the one or more seams.

In some embodiments, the attachment system may include one or more seams to join the side panel to a portion of the dress cover.

In some embodiments, the dress cover may include a seatback cover layer and a seatback cushion layer, the seatback cushion layer being integrated with the seatback cover layer.

In some embodiments, the substrate may include one or more seatback frame mount cut outs configured to conform to one or more seatback frame mounts of the seatback frame.

In some embodiments, the attachment system may further include one or more flaps including one or more fastening assemblies configured to visually hide the one or more seatback frame mounts.

In some embodiments, the substrate may be formed of a thermoformed plastic or laminated fiberglass.

An aircraft seat is disclosed, in accordance with one or more embodiments of the present disclosure. In one embodiment, the aircraft seat includes a support system including a seatback frame and a seat pan frame. In another embodiment, the aircraft seat includes a seat pan cover including at least one surface configured to conform to a corresponding surface of the support system. In another embodiment, the aircraft seat includes a seatback cover attachment system. In another embodiment, the attachment system includes a substrate, the substrate configured to reversibly couple to a portion of the seatback frame, the substrate including one or more surfaces that define a channel, the channel configured to receive a portion of the seatback frame. In another embodiment, the attachment system includes a seatback cover sub-system, the seatback cover sub-system. In another embodiment, the seatback cover sub-system includes a dress cover. In another embodiment, the seatback cover sub-system includes a side panel, the side panel configured to couple to a portion of the substrate, the side panel configured to couple to one or more portions of the dress cover to form the seatback cover sub-system. In another embodiment, the seatback cover attachment system is configured to secure the seatback cover sub-system to the seatback frame via the substrate.

In some embodiments, the seatback frame may be configured to fit within the channel of the seatback cover attachment system.

In some embodiments, the seatback frame may be configured be inserted in the channel of the seatback cover attachment system.

In some embodiments, the seatback frame may be configured to engage with the substrate via a force applied in a direction downward from the channel of the seatback cover attachment system.

In some embodiments, the seatback frame may be configured to disengage from the substrate via a force applied in a direction upward from the channel of the seatback cover attachment system.

In some embodiments, the substrate and the side panel may at least partially overlap to prevent a seatback diaphragm of the seatback frame from cutting into a portion of the side panel.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
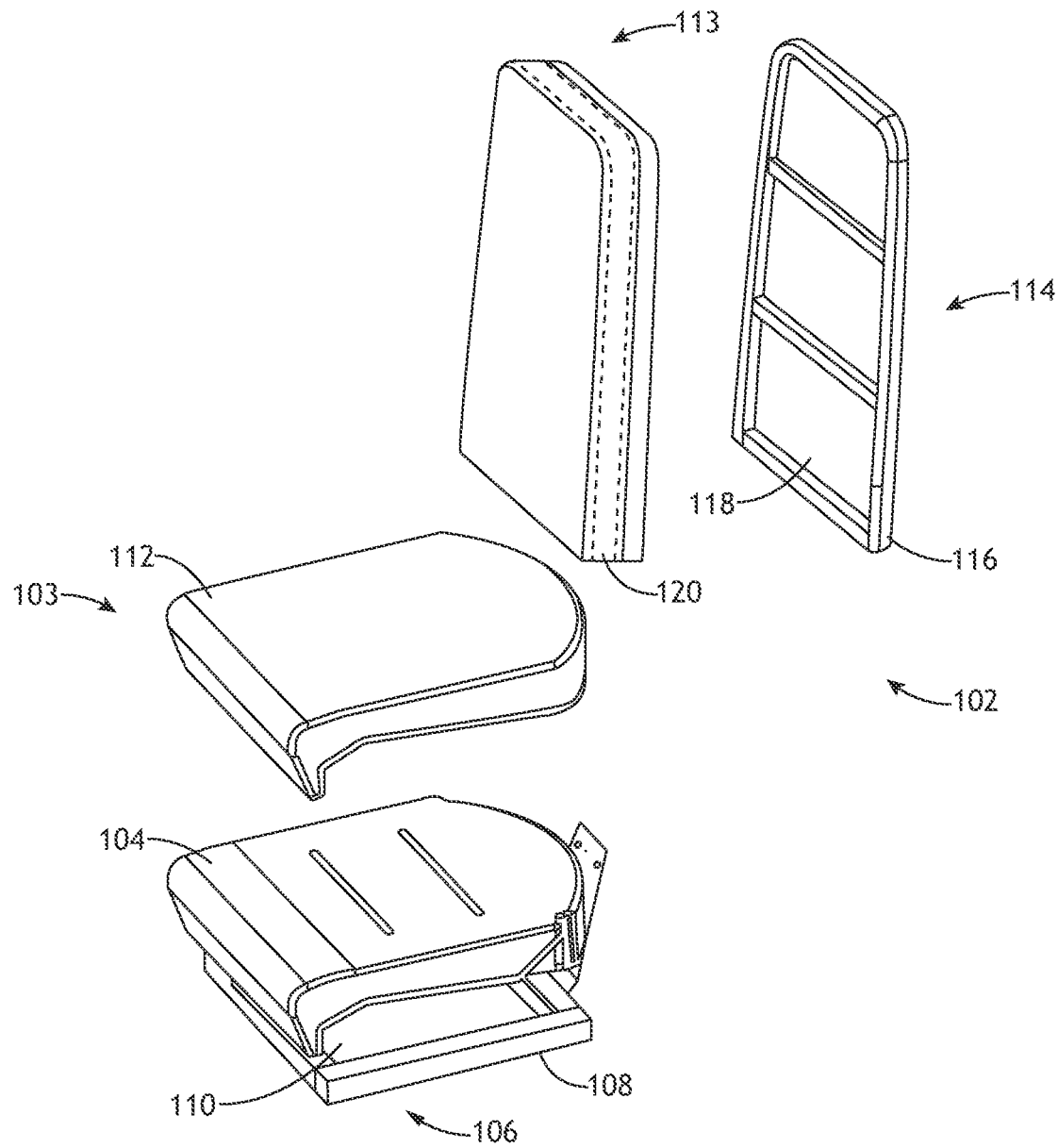
FIG. 1 illustrates an exploded perspective view of an aircraft seat including a seatback cover attachment system, in accordance with one or more embodiments of the disclosure.
Figure 2A:
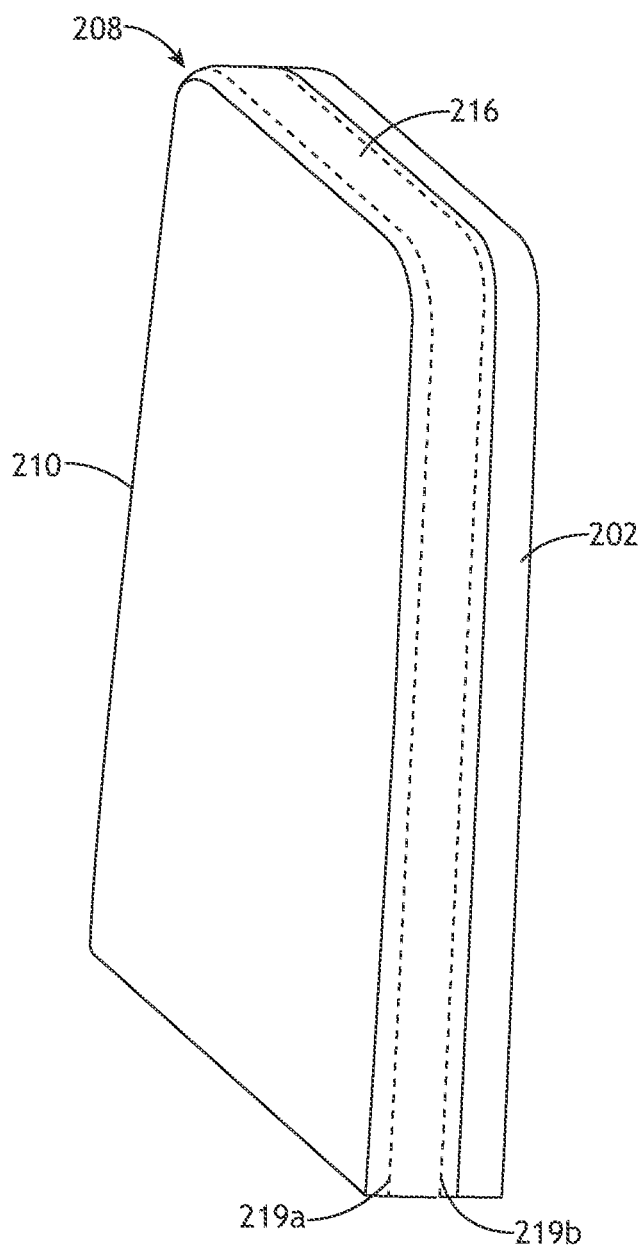
FIG. 2A illustrates a side perspective view of the seatback cover attachment system, in accordance with one or more embodiments of the disclosure.
Figure 2B:
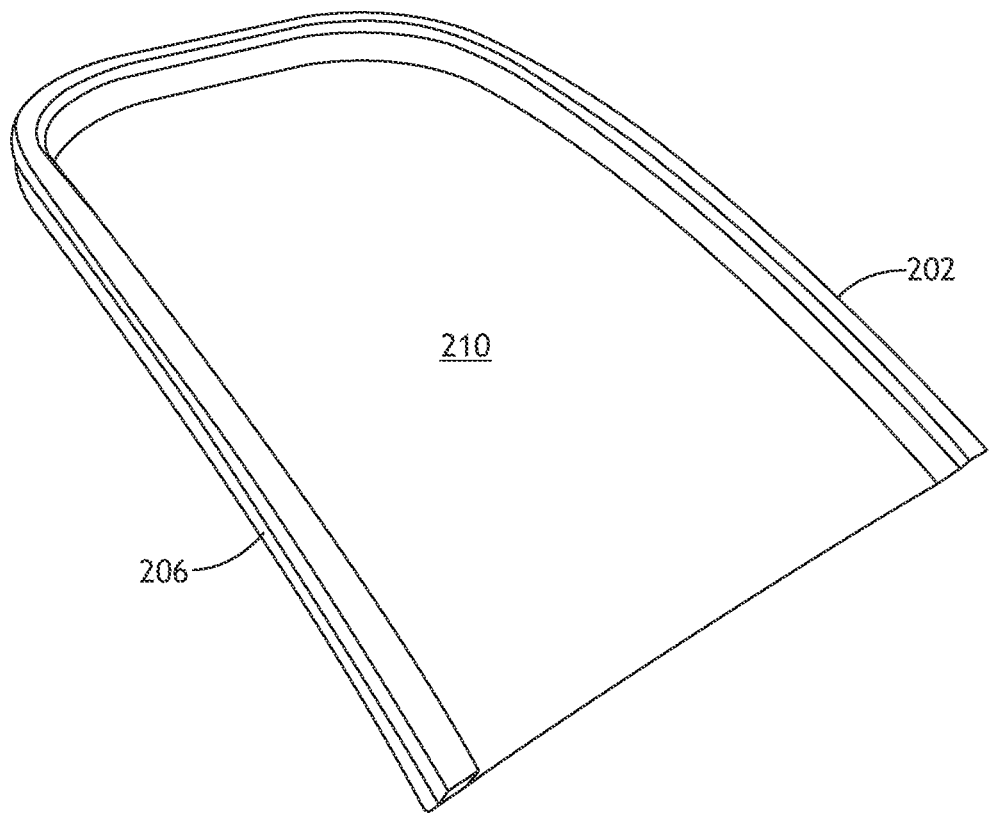
FIG. 2B illustrates a rear perspective view of the seatback cover attachment system, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements 108 and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1-8 in general illustrate an aircraft seatback cover attachment system, in accordance with one or more embodiments of the disclosure.

Seats may include some combination of components such as, but not limited to, a seat pan cover, a seatback cover, a seat pan cushion, a seatback cushion, a seat pan support system, and a seatback support system. In select seat designs, the seatback cover alone may be composed of numerous pieces, where each piece is then coupled together to form the seatback cover. After the individual components are assembled, the seat components may be coupled together with one or more attachment assemblies to form the aircraft seat.

These methods of manufacture and attachment may require extensive assembly and installation time. For example, these methods may require thirty minutes of assembly time and approximately twenty minutes of installation time. In addition, these methods may cause difficulties during alignment and/or an indeterminateness in the alignment of the seatback cover, cushion, and/or support system during manufacturing and/or installation of the aircraft seat. Further, the methods may result in increased cost in manufacturing and/or installation.

The seatback cover may be subjected to stress, strain, dirt or other mess such as airsickness, contraband, or the like resulting in damage of the seatback cover. After a period of time and/or a particular type of wear factor occurring, the seatback cover may be removed for cleaning and/or replacement. Removing and re-installing the seatback cover may require a method that is quick, inexpensive, and not labor intensive. For example, the seatback cover attachment system should be quickly dismantled and put together without incurring considerable labor costs.

In addition, in select industries the build of the seat (and any included components within the build) may be required to meet guidelines and/or standards. For example, aircraft seats may be required to meet aviation guidelines and/or standards. For instance, the select aircraft seats may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like. Seatback cover attachment systems may present difficulties such as, but not limited to, failing to meet load requirements (e.g., 9 g static load requirements or 16 g dynamic load requirements), burn requirements, or the like as set forth by the FAA in 14 C.F.R. Part 25, AIRWORTHINESS STANDARDS: TRANSPORT CATEGORY AIRPLANES).

As such, it would be desirable to provide a seatback cover attachment system. The seatback cover attachment system should reduce the number of parts, allowing for more efficient removal and installation of the seatback cover. For example, the seatback cover attachment system may include an integrated seatback cover and cushion sub-system to eliminate the need for an additional seatback cushion component. The seatback cover attachment system should be inexpensive to implement, whether on a retrofitted aircraft seat or in a new aircraft seat design. The seatback cover attachment system should reduce the amount of seatback frame finishing steps. The seatback cover attachment system should be configured in accordance with aviation guidelines and/or standards.

Referring in general to FIGS. 1-6D, one or more seatback cover attachment systems may be integrated within an aircraft seat 100 installed within an aircraft cabin. For example, the aircraft seat 100 may include, but is not limited to, a business class or first-class passenger seat, an economy-class passenger seat, a crew member seat, or the like. It is noted herein the terms "aircraft seats" and "passenger seats" may be considered equivalent, for purposes of the disclosure.

The aircraft seat 100 may be rotatable about an axis (e.g., swivelable). The aircraft seat 100 may be fully positionable between the outer limits of motion as defined by the moveable components of the aircraft seat 100. Where the aircraft seat 100 is installed within a passenger compartment, the aircraft seat 100 may be fully positionable between the outer limits of motion as defined by one or more passenger compartment monuments of the passenger compartment. It is noted herein an upright or raised position may be considered a taxi, takeoff, or landing (TTL) position during select stages of flight (though the upright or raised position is not limited to use during the select stages of flight as the TTL position, but also may be used at any point during the flight), for purposes of the present disclosure. In addition, it is noted herein that any position that does not meet the above-defined requirements of the TTL position may be considered a non-TTL position, for purposes of the present disclosure. Further, it is noted herein the aircraft seat 100 may be actuatable (e.g., translatable and/or rotatable) from the TTL position to a non-TTL position, and/or vice versa. Further, it is noted herein the aircraft seat 100 may be capable of a fully upright or raised position, and that the TTL position may have a more reclined seatback cushion and a more angled upward seat pan cushion as compared to the fully upright or raised position. Therefore, the above description should not be interpreted as a limitation on the present disclosure but merely an illustration.

In general, an aircraft seat 100 may be translatable (e.g., trackable or slidable). The aircraft seat 100 may be rotatable about an axis cross-wise through the aircraft seat 100 into a position including, but not limited to, the upright or raised position, one or more lounge or reclined positions, and a lie-flat or bed position. For example, the aircraft seat 100 may transition directly between the upright or raised position and the lie-flat or bed position. By way of another example, it is noted herein the aircraft seat 100 may transition through one or more lounge or reclined positions between the upright or raised position and the lie-flat or bed position. By way of another example, the aircraft seat 100 may transition into one or more lounge or reclined positions in a motion separate from the transition between the upright or raised position and the lie-flat or bed position. Therefore, the above description should not be interpreted as a limitation on the scope of the disclosure but merely an illustration.

The aircraft seat 100 may include a support system 102. The support system 102 may be a rigid structure within the aircraft seat 100, such that the support system 102 does not move. The support system 102 may include one or more movable components such that the support system 102 may articulate. For example, the support system 102 may articulate when the aircraft seat 100 actuates between the upright or raised position, the one or more lounge or reclined positions, and/or the lie-flat or bed position.

The support system 102 may include a seat pan 103. The aircraft seat 100 may include a seat pan cushion 104. The aircraft seat 100 may include a seat pan frame 106 including one or more seat pan frame elements 108. For example, one or more seat pan frame elements 108 may include, but are not limited to, seat pan structural hoops. The seat pan frame 106 including the one or more seat pan frame elements 108 may form a portion of an exterior boundary of the seat pan of the aircraft seat 100. Although FIG. 1 depicts the support system 102 including a seat pan cushion, seat pan frame, seat pan elements, seat pan diaphragm, seat pan cover, and the like, it is noted herein the support system 102 may not include one or more of the following: a seat pan cushion, seat pan frame, seat pan elements, seat pan diaphragm, seat pan cover, and the like. Therefore, FIG. 1 and the related discussion should not be construed as limiting the scope of the present disclosure.

The support system 102 may include a seat pan diaphragm 110. The seat pan diaphragm 110 may include any type of diaphragm including, but not limited to, a plastic diaphragm, a metal diaphragm, a fabric diaphragm, a wire or wireframe diaphragm, or the like.

The seat pan cushion 104 may conform or substantially conform to the support system 102. For example, at least one surface of the seat pan cushion 104 may conform to a corresponding surface of the support system 102. By way of another example, components of the support system 102 (e.g., components including, but not limited to, straps configured to couple the diaphragm 110 to the seat pan frame 106 with the one or more seat pan frame elements 108, where the support system 102 is or includes the diaphragm 110) may extend beyond the boundaries of the cushion 104, such that the at least one surface of the cushion 104 does not fully conform to the corresponding surface of the support system 102. By way of another example, a portion of the cushion 104 may wrap around or otherwise enclose a portion of the support system 102 (e.g., including, but not limited to, a front edge or leading portion of the cushion 104). In general, the support system 102 may conform to a portion of a user (e.g., a passenger, a crew member, or the like), and the cushion 104 may similarly conform to the portion of the user due to the cushion 104 conforming to the support system 102.

The aircraft seat 100 may include a seat pan cover 112. The seat pan cover 112 may be configured to fit over at least a portion of the seat pan cushion 104. For example, the seat pan cover 112 may be configured to wrap around or otherwise enclose exterior surfaces of the seat pan cushion 104 not proximate to the support system 102. The seat pan cover 112 may be configured to attach to the support system 102 and/or the cushion 104. It is noted herein "seat cover" and "dress cover" may be considered equivalent, for purposes of the disclosure.

The support system 102 may include a seatback 113. The aircraft seat 100 may include a seatback frame 114 including one or more seatback frame elements 116. For example, one or more seatback frame elements 116 may include, but are not limited to, seatback structural hoops. The seatback frame 114 including the one or more seatback frame elements 116 may form a portion of an exterior boundary of the seatback of the aircraft seat 100.

The support system 102 may include a seatback diaphragm 118. The diaphragm 118 may include any type of diaphragm including, but not limited to, a plastic diaphragm, a metal diaphragm, a fabric diaphragm, a wire or wireframe diaphragm, or the like.

The aircraft seat 100 may include a seatback attachment cover system 120. The seatback attachment system 120 may be configured to fit over at least a portion of the seatback frame 114.

Figure 7:
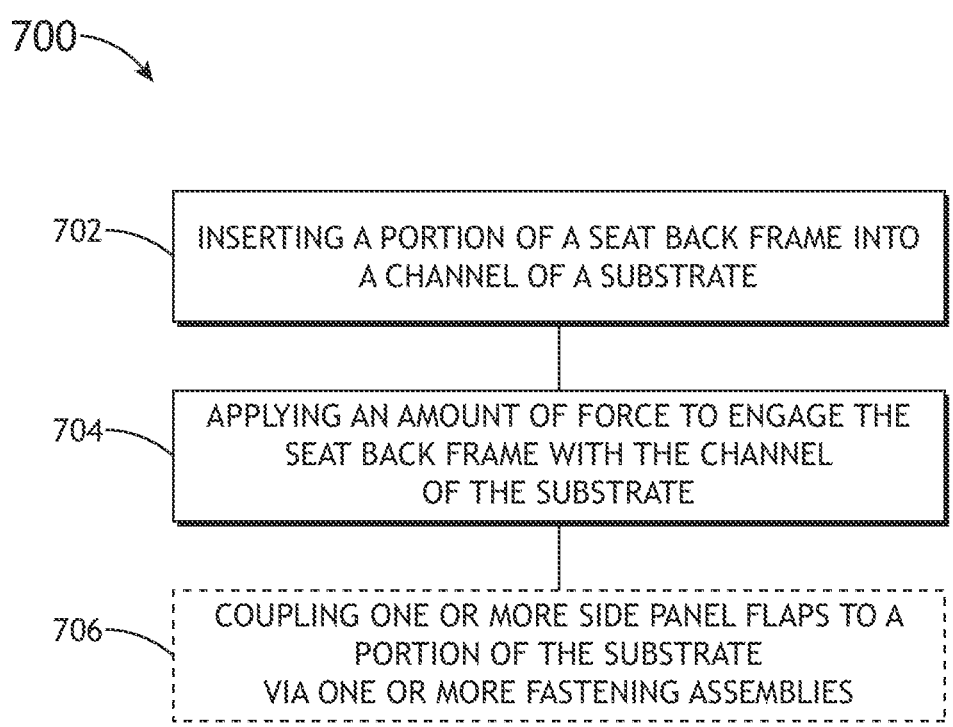
FIG. 7 illustrates a flowchart depicting a method or process for assembling a seat cover attachment system, in accordance with one or more embodiments of the disclosure.
Figure 8:
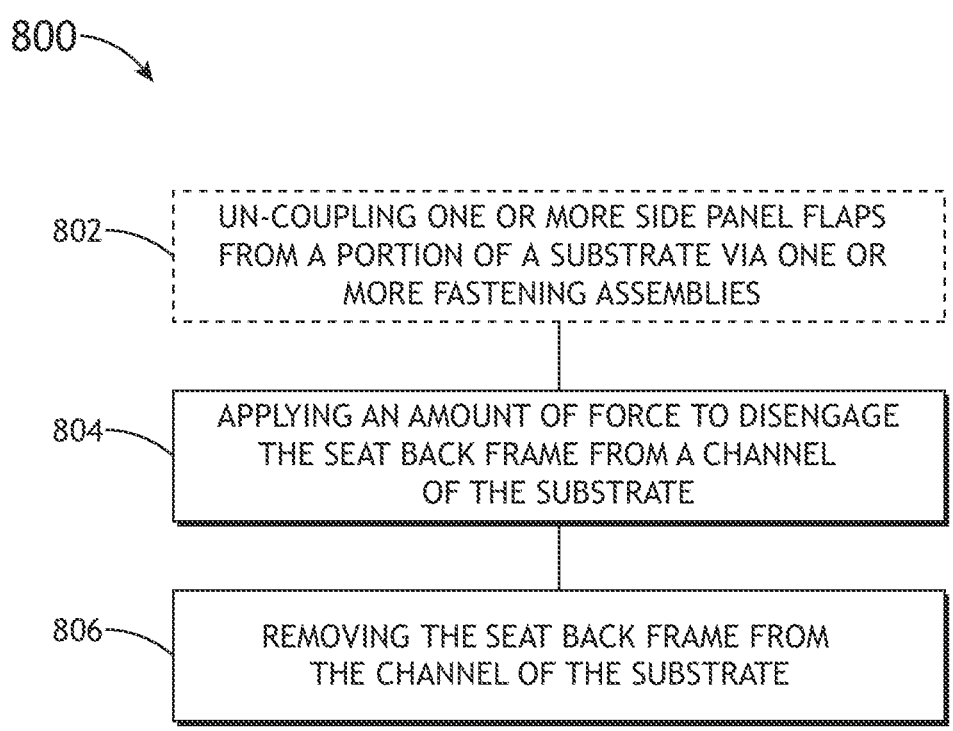
FIG. 8 illustrates a flowchart depicting a method or process for assembling a seat cover attachment system, in accordance with one or more embodiments of the disclosure.

FIGS. 2A-6D illustrate components of a seatback cover attachment system 120, in accordance with one or more embodiments of the disclosure. FIG. 7 is a method or process 700 for installing the seatback cover attachment system 120 on the aircraft seat 100, in accordance with one or more embodiments of the disclosure. FIG. 8 is a method or process 800 for uninstalling the seatback cover attachment system 120 from the aircraft seat 100, in accordance with one or more embodiments of the disclosure. It is noted herein "seatback cover attachment system" and variants including, but not limited to, "attachment system" or "system" may be considered equivalent, for purposes of the disclosure.

Figure 3A:
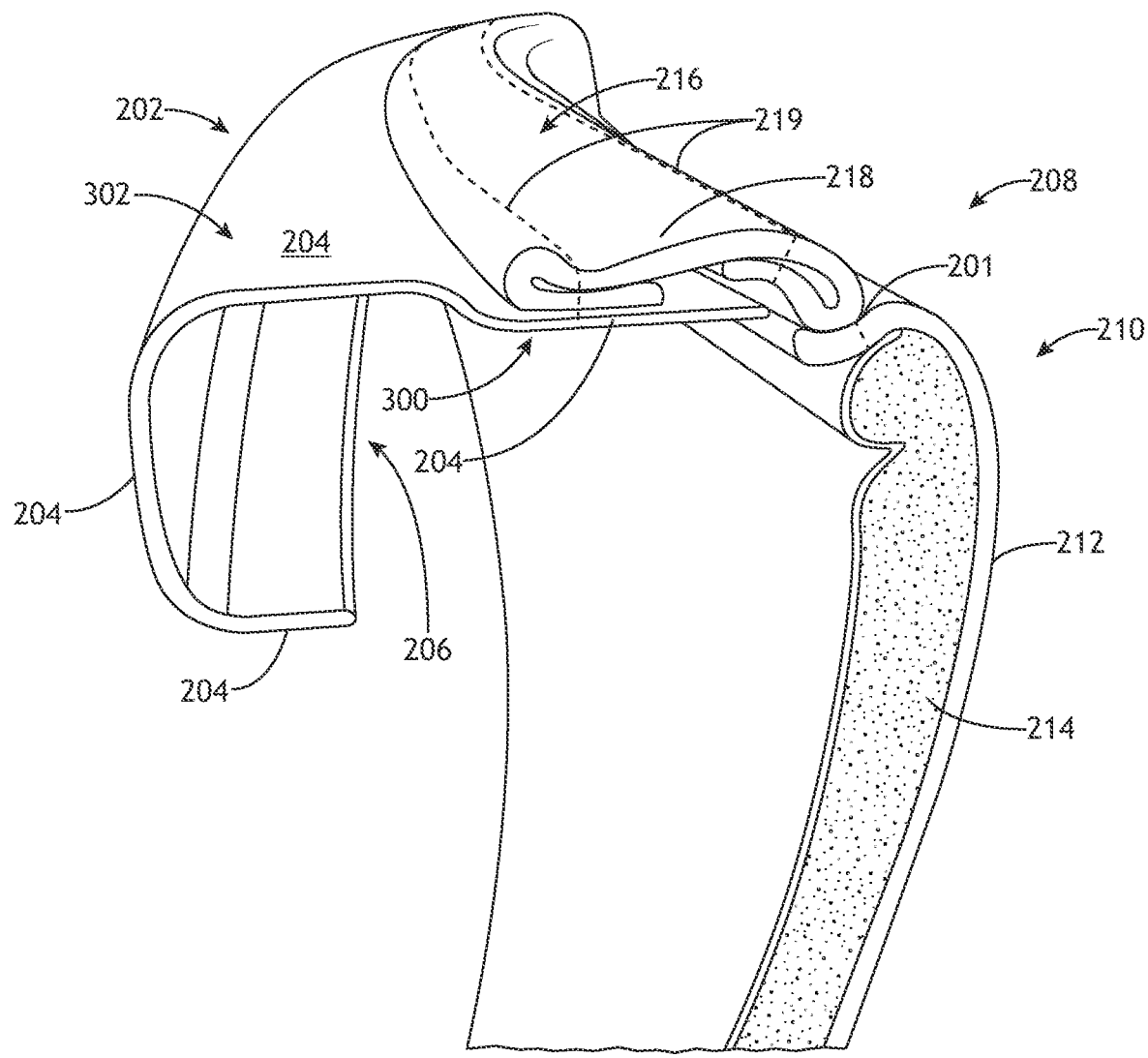
FIG. 3A illustrates a cross sectional view of the seatback cover attachment system, in accordance with one or more embodiments of the disclosure.

The attachment system 120 may include a substrate 202. For example, the attachment system 120 may include a substrate 202 configured to attach to a portion of the one or more seatback frame elements 116. The substrate 202 may include one or more surfaces 204 that define a channel 206. For example, the channel 206 may be configured to receive a portion of the one or more seatback frame elements 116 of the seatback frame 114. For instance, the channel 206 may include a cross-section shaped to receive and/or conform to a portion of the seatback frame 114. As shown in FIG. 3A, the channel 206 may be a "J-channel". Further, the channel 206 may be a "C-channel". Further, the channel 206 may be a "L-channel". In general, the channel may include a cross-section having any shape configured to receive and/or conform to a portion of the seatback frame 114.

When attached to the seatback frame 114, the substrate 202 may substantially enclose the seatback frame 114, such that only a portion of the seatback frame 114 may be visible when fully assembled. In this regard, the one or more surfaces 204 of the substrate 202 may be configured to hide various manufacturing imperfections in the seatback frame 114. Further, the substrate 202 may be configured to reduce seatback frame finishing steps.

The substrate 202 may be formed of any material. For example, the substrate 202 may be formed of a thermoformed plastic including, but not limited to, acrylic-polyvinyl chloride, polyethylene terephthalate (PET), polystyrene (HIPS), high-density polyethylene (HDPE), polyvinyl chloride (PVC), polyethylene terephthalate glycol-modified (PETG), or the like. By way of another example, the substrate 202 may be formed of laminated fiberglass. In general, the substrate 202 may be configured to be formed from any material (e.g., plastic, metal, or the like) configured to meet aviation guidelines and/or standards (e.g., for load-bearing requirements, burn requirements, or the like).

The seatback cover attachment system 120 may include an integrated seatback cover and cushion sub-system 208. It is noted herein "integrated seatback cover and cushion sub-system" and variants including, but not limited to, "integrated cover and cushion sub-system" or "sub-system" may be considered equivalent, for purposes of the disclosure.

The integrated cover and cushion sub-system 208 may include a dress cover 210. It is noted herein the dress cover 210 may conform to a portion of a user (e.g., a passenger, a crew member, or the like), or may be independently-shaped.

The dress cover 210 may include a seatback cover layer 212. The seatback cover layer 212 may be formed of any material known in the art including, but not limited to, leather, synthetic leather, fabric, or the like.

The dress cover 210 may include a seatback cushion layer 214. The seatback cushion layer 214 may be formed of any material known in the art including, but not limited to, foam, or the like.

The seatback cushion layer 214 may be integrated with the seatback cover layer 212 of the dress cover 210. For example, the dress cover 210 may be formed of a laminated piece of material integrated with a cushion backing (e.g., a foam backed fabric). It is noted that the seatback cushion layer 214 may be integrated with the seatback cover layer 212 via any fabrication process (e.g., sewing, or the like) or fastening mechanism (e.g., an adhesive, or the like). In this regard, the seatback cover attachment system 120 may include an integrated seatback cover and cushion assembly to eliminate the need for an additional seatback cushion component, thereby reducing the assembly time by reducing the number of seatback component parts.

Although embodiments of the disclosure illustrate the dress cover 210 including a seatback cushion layer 214, it is noted herein the seatback cushion layer 214 may be separate from the dress cover 210 (e.g., where a cushion layer is separately installed on the aircraft seat 100) and/or the seatback cushion layer 214 may not be installed on the aircraft seat 100). Therefore, the above description should not be interpreted as a limitation on the present disclosure but merely an illustration.

The integrated cover and cushion sub-system 208 may include a side panel 216. The side panel 216 may be formed of a piece of wrapped fabric 218.

The side panel 216 may be coupled to one or more portions of the dress cover 210 via one or more attachment mechanisms formed via one or more fabrication processes to form the integrated cover and cushion sub-system 208. For example, the side panel 216 may be coupled to one or more portions of the dress cover 210 via one or more seams 219 generated via one or more sewing processes.

The side panel 216 may be coupled to one or more portions of the substrate 202. For example, the side panel 216 may be coupled to a portion of the substrate 202 via one or more seams 219. In this regard, a first end of the side panel 216 may be sewn directly onto a surface 204 of the substrate 202 via a first seam 219a. It is noted that this single seam coupling mechanism may be configured to allow for efficient assembly to reduce assembly time.

Figure 3B:
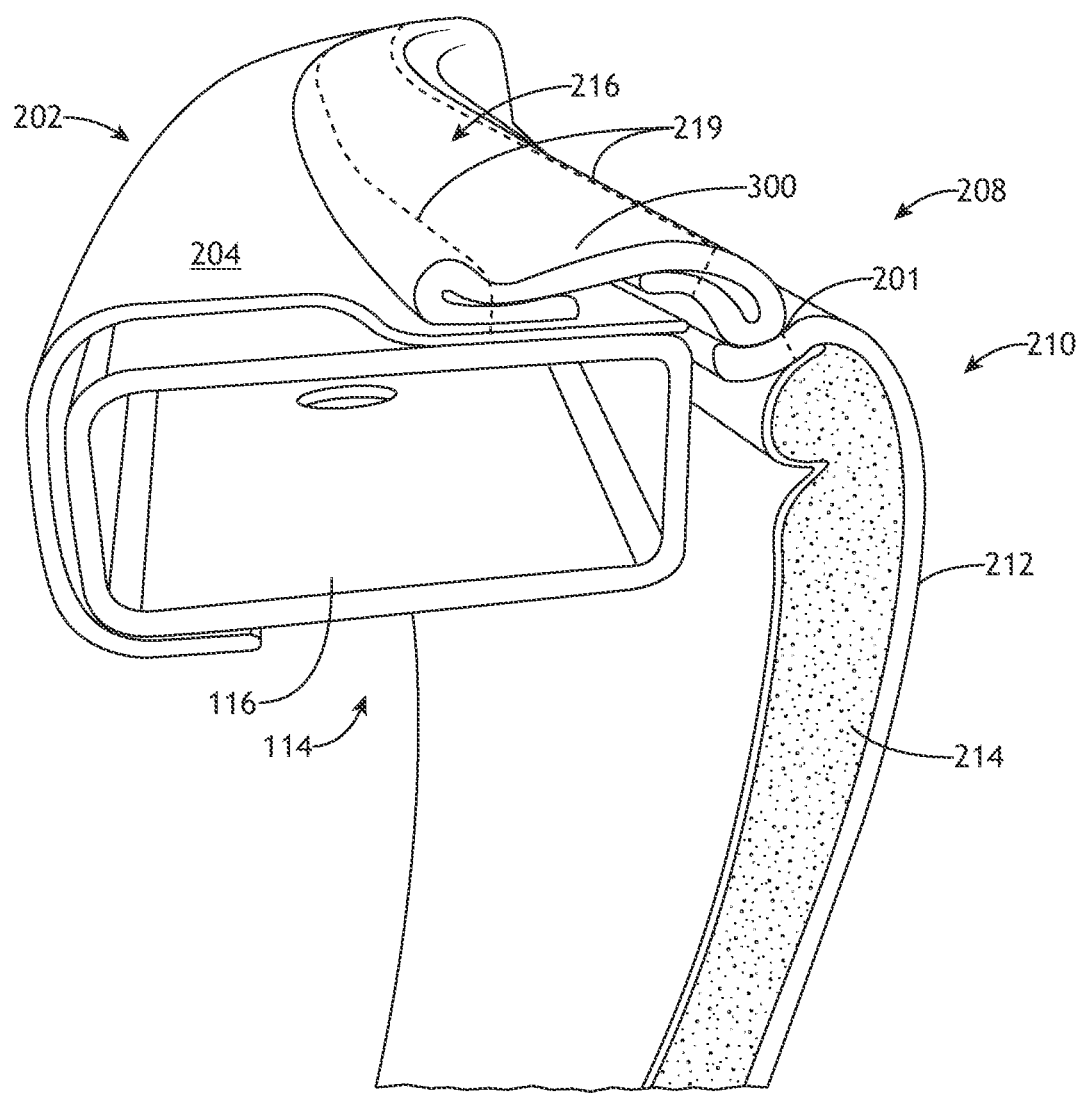
FIG. 3B illustrates a cross sectional view of the seatback cover attachment system, in accordance with one or more embodiments of the disclosure.

Although FIGS. 3A-3B depict the side panel 216 coupled to the top surface of the substrate 202, it is noted that the side panel 216 may be coupled to any surface of the substrate 202. For example, the side panel 216 may be coupled to a side surface of the substrate 202. By way of another example, the side panel 216 may be coupled to a bottom surface of the substrate 202.

In one non-limiting example, the attachment system 120 may be formed of three parts (e.g., substrate 202, dress cover 210, and side panel 216), where the three parts may be coupled together to form the attachment system 120. The attachment system 120 may include one or more seams joining the three parts. For example, the attachment system 120 may include a first seam 219a joining the dress cover 210 and the side panel 216. By way of another example, the attachment system 120 may include a second seam 219b joining the side panel 216 and the substrate 202. It is noted herein, however, the attachment system 120 may include any number of seams 219. Therefore, the above description should not be interpreted as a limitation on the present disclosure but merely an illustration.

The substrate 202 may include a contoured surface including a lowered portion 300 and a raised portion 302 on a surface 204 of the substrate 202. The fabric 218 of the dress cover 210 may be configured to attached to the lowered portion 300 via one or more attachment mechanisms (e.g., one or more seams 219, or the like) generated by one or more fabrication processes (e.g., one or more sewing processes, or the like). The raised portion 302 may be dimensioned to obscure the one or more seams 219 from a rear view of the aircraft seat 100. For example, the height of the raised portion 302 may be greater than or equal to the thickness of the fabric 218 of the side panel 216 to obscure the seam 219.

Although embodiments of the disclosure illustrate the one or more fabrication processes including one or more sewing processes to join together dress cover 210, the side panel 216, and the substrate 202 at one or more seams 219, it is noted herein the one or more fabrication processes are not limited to one or more sewing processes. For example, the dress cover 210, the side panel 216, and the substrate 202 may be joined together by mechanical fasteners including, but not limited to, zippers, hook-and-loop fasteners, rivets, and the like. By way of another example, the dress cover 210, the side panel 216, and the substrate 202 may be joined together by bonding agents including, but not limited to, adhesives, or the like. Therefore, the above description should not be interpreted as a limitation on the present disclosure but merely an illustration.

Figure 4:
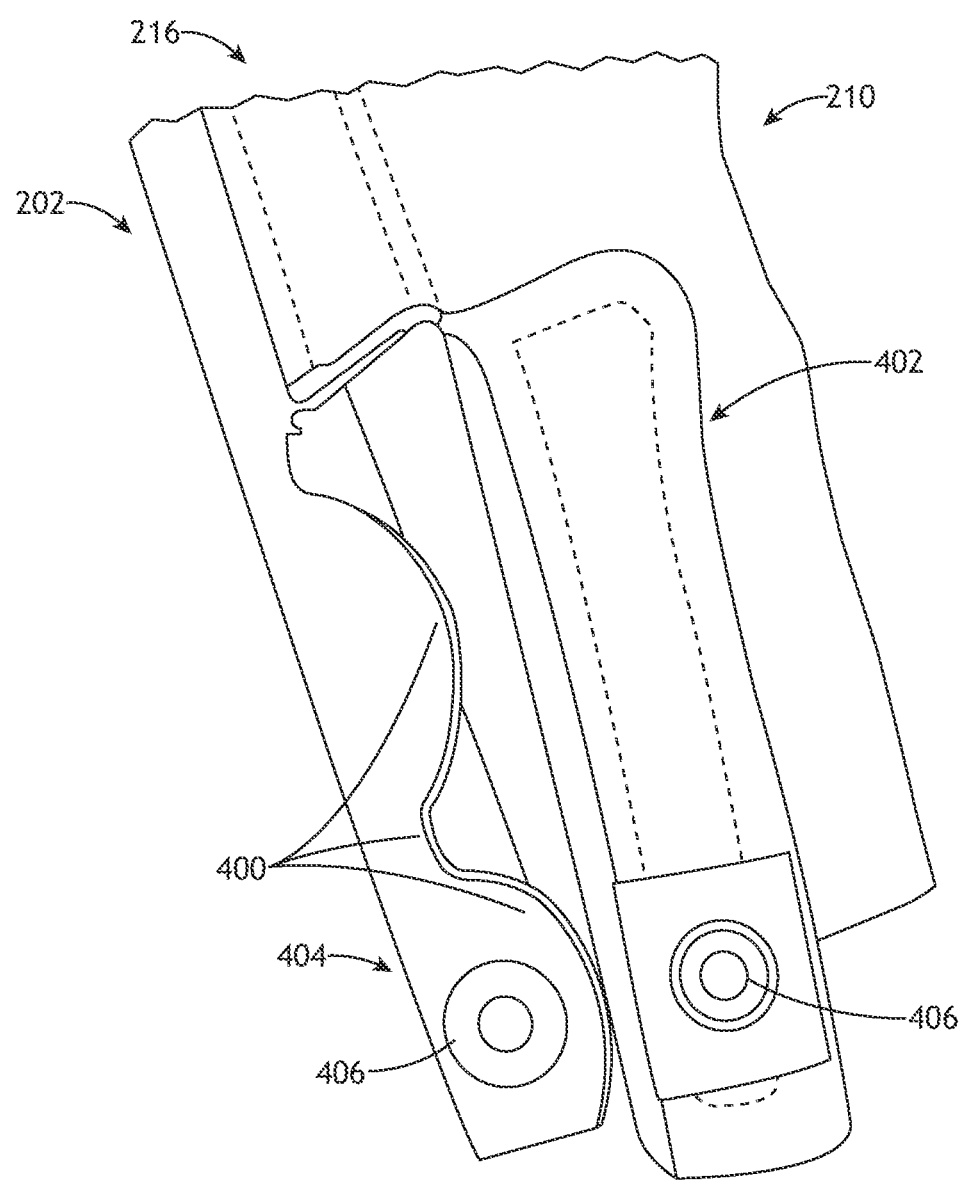
FIG. 4 illustrates an isolated view of a fastening assembly of the seatback cover attachment system, in accordance with one or more embodiments of the disclosure.
Figure 5A:
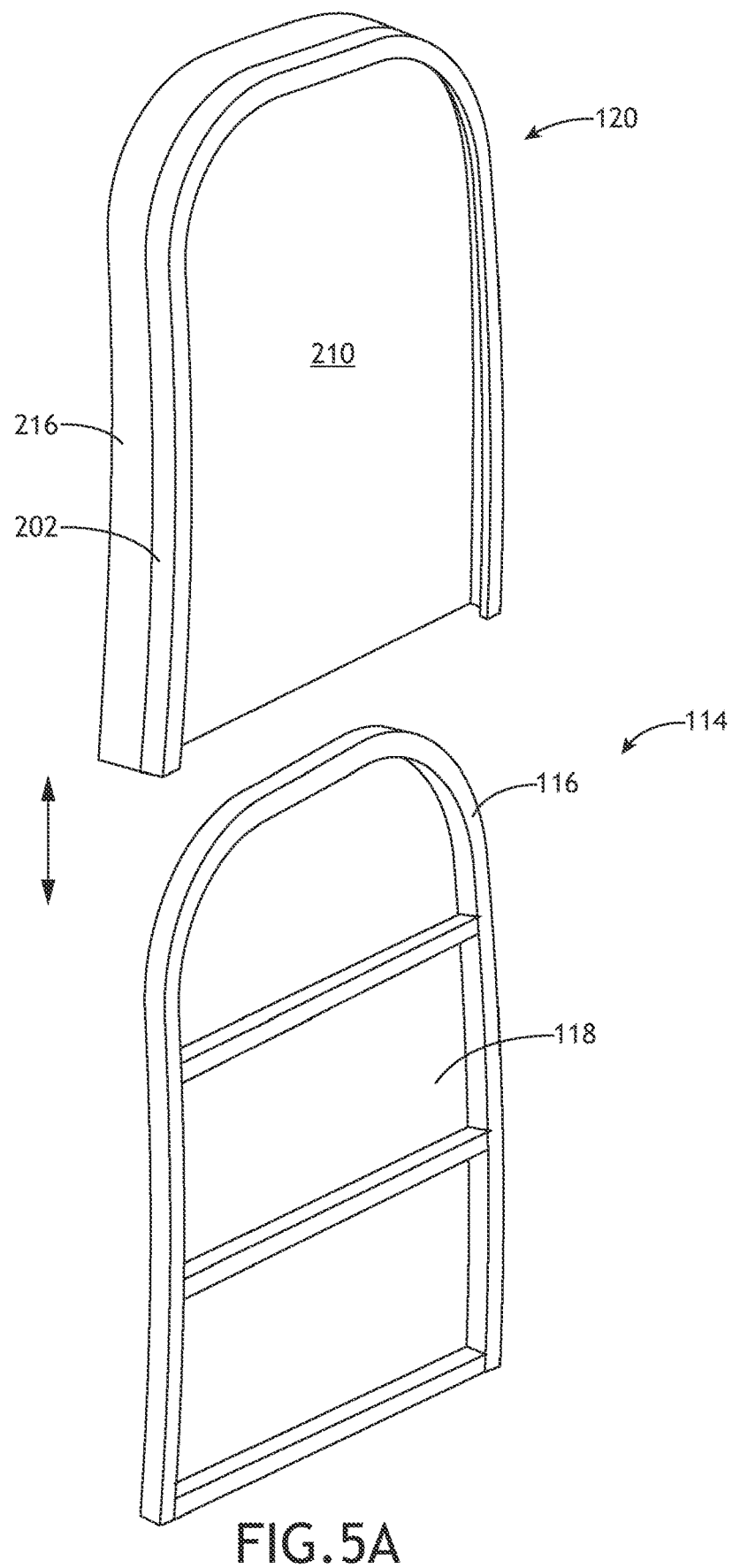
FIG. 5A illustrates a perspective view of an aircraft seat including a seatback cover attachment system, in accordance with one or more embodiments of the disclosure.
Figure 5B:
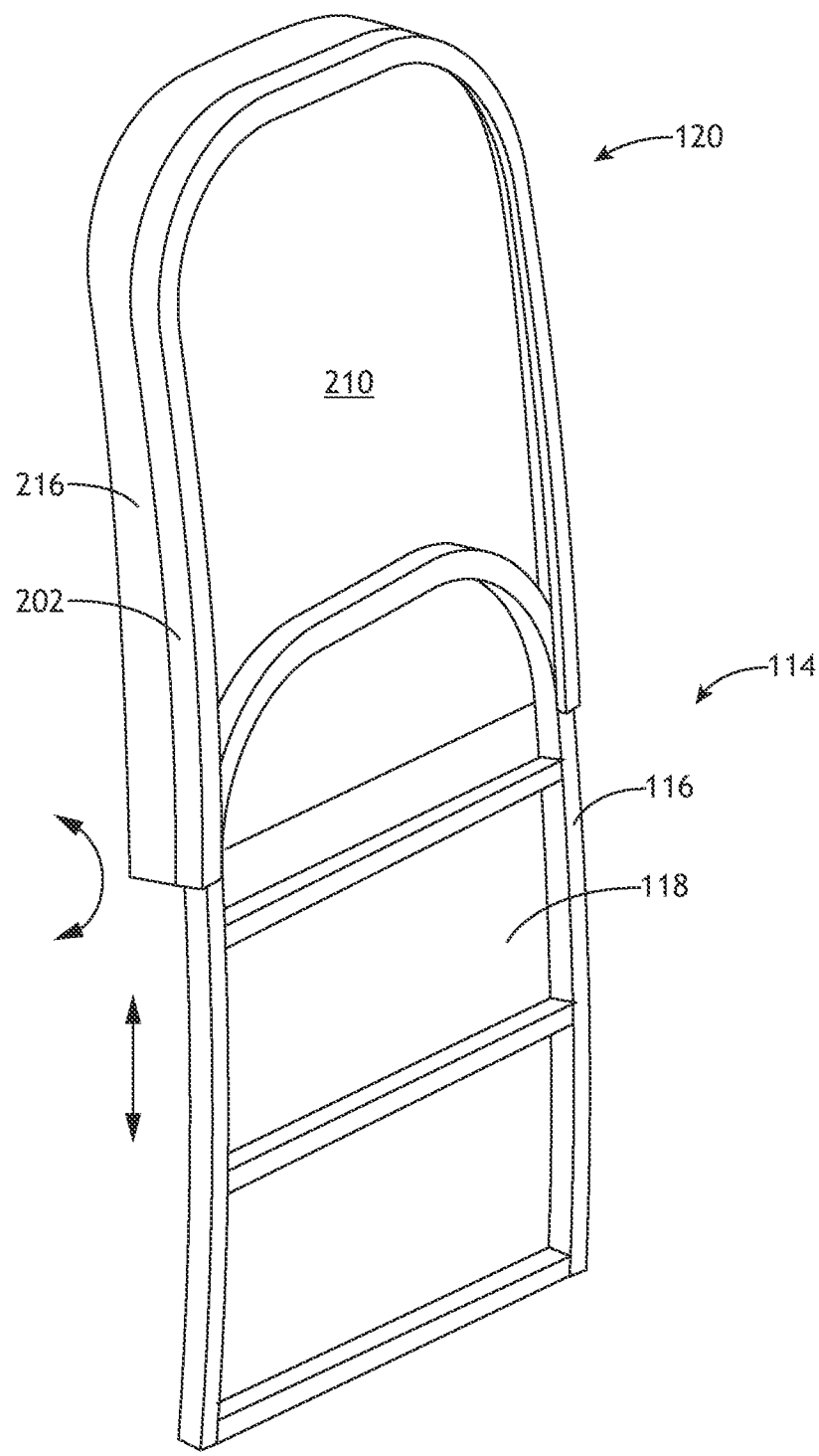
FIG. 5B illustrates a perspective view of an aircraft seat including a seatback cover attachment system, in accordance with one or more embodiments of the disclosure.
Figure 5C:
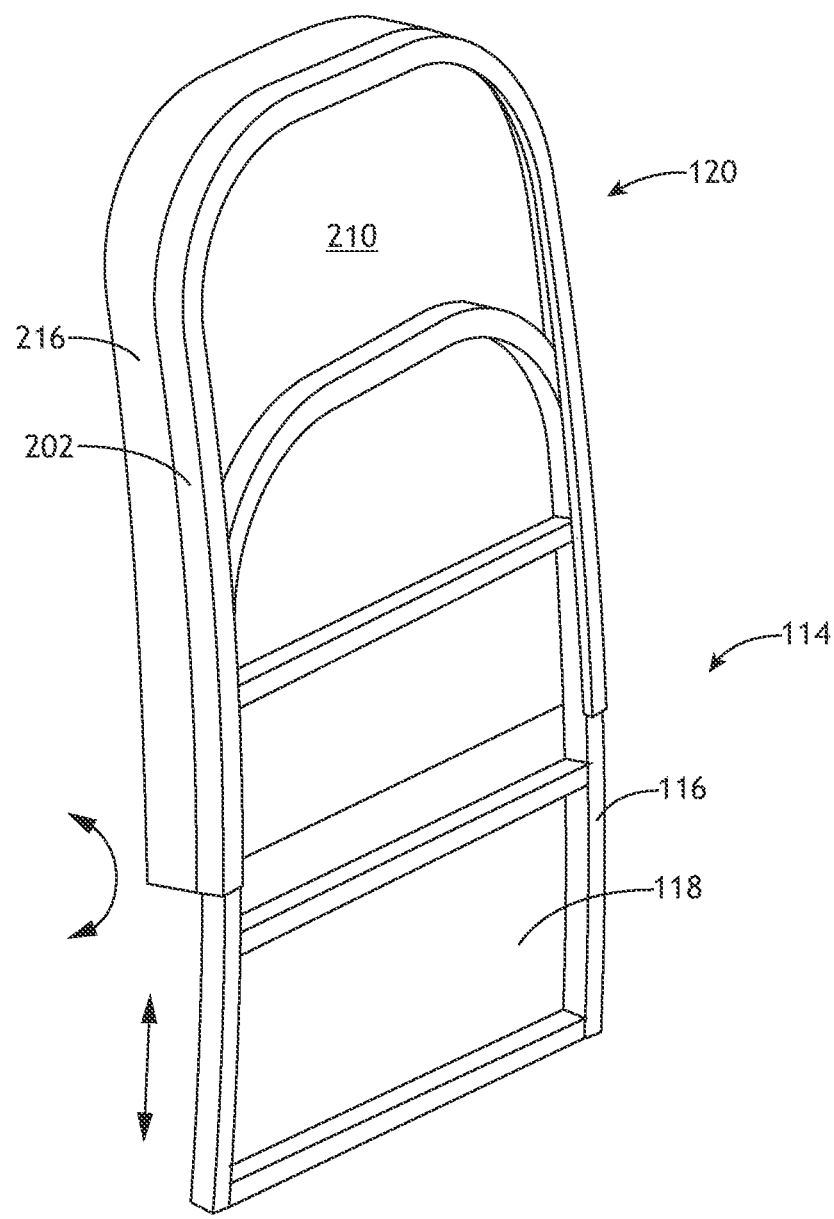
FIG. 5C illustrates a perspective view of an aircraft seat including a seatback cover attachment system, in accordance with one or more embodiments of the disclosure.
Figure 5D:
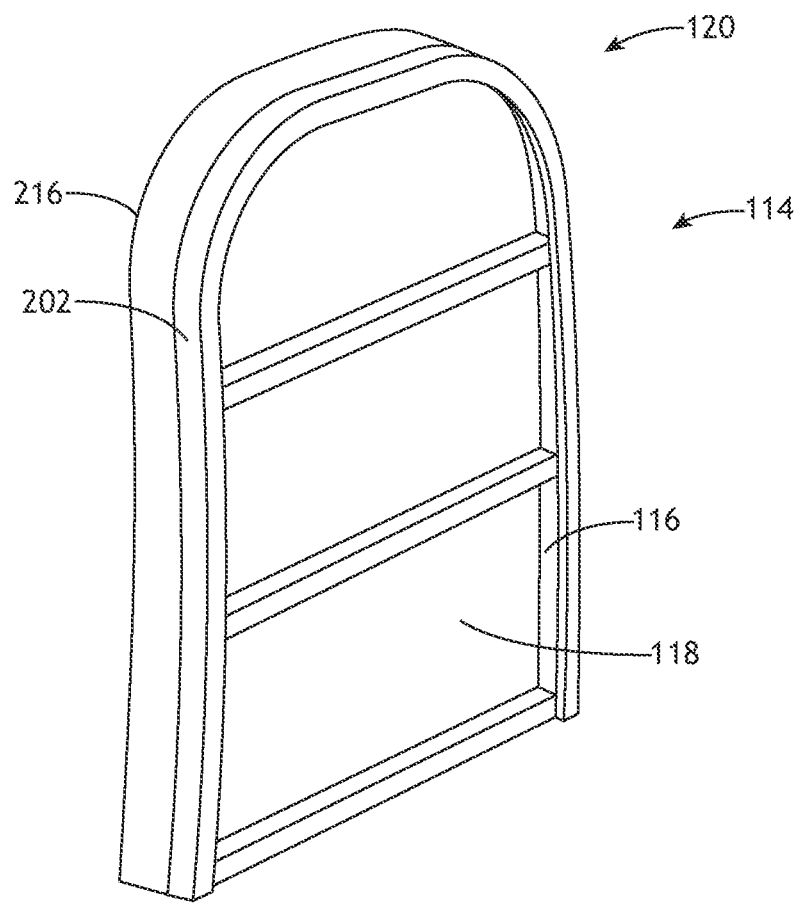
FIG. 5D illustrates a perspective view of an aircraft seat including a seatback cover attachment system, in accordance with one or more embodiments of the disclosure.
Figure 6A:
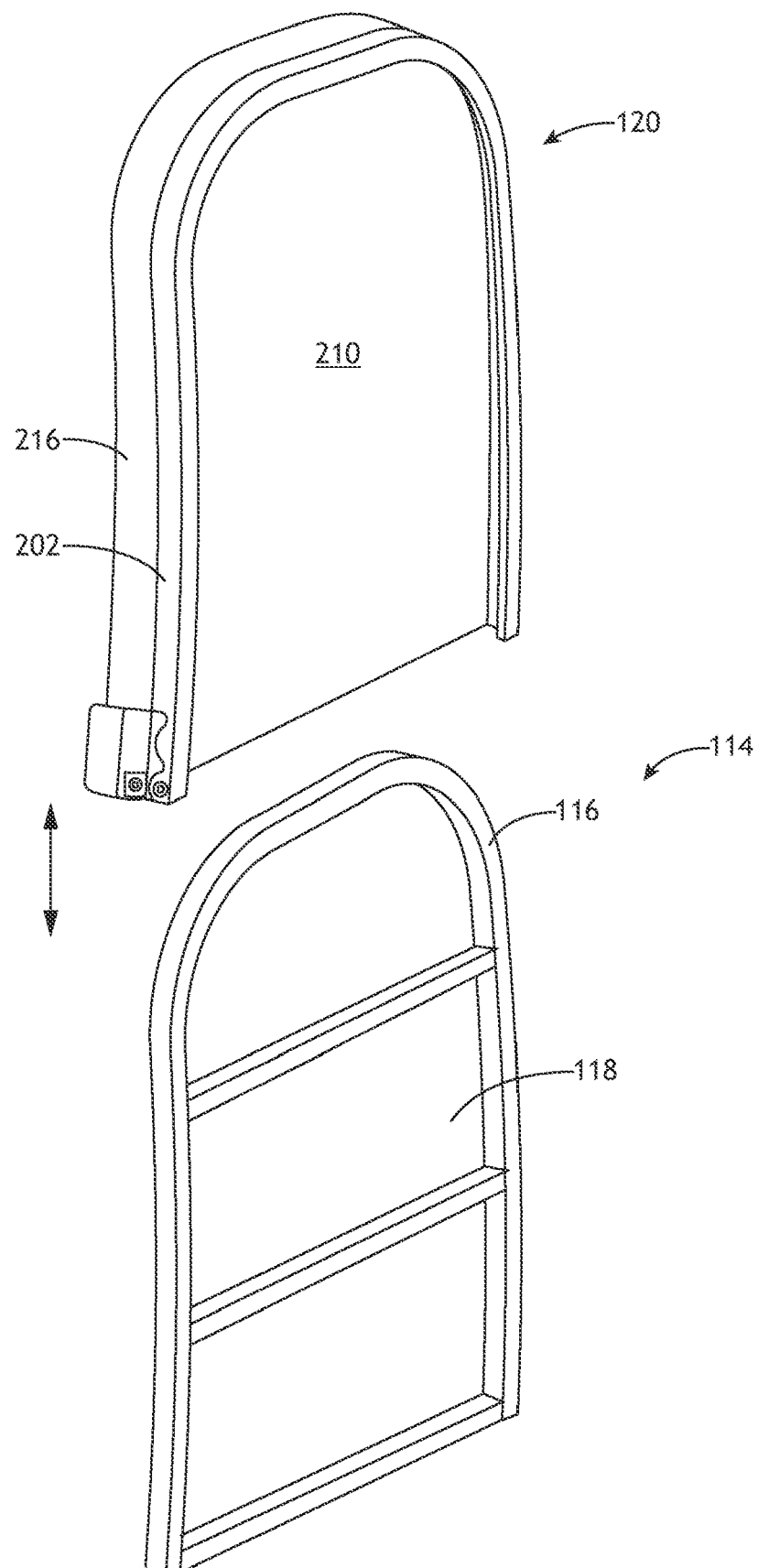
FIG. 6A illustrates a perspective view of an aircraft seat including a seatback cover attachment system, in accordance with one or more embodiments of the disclosure.
Figure 6B:
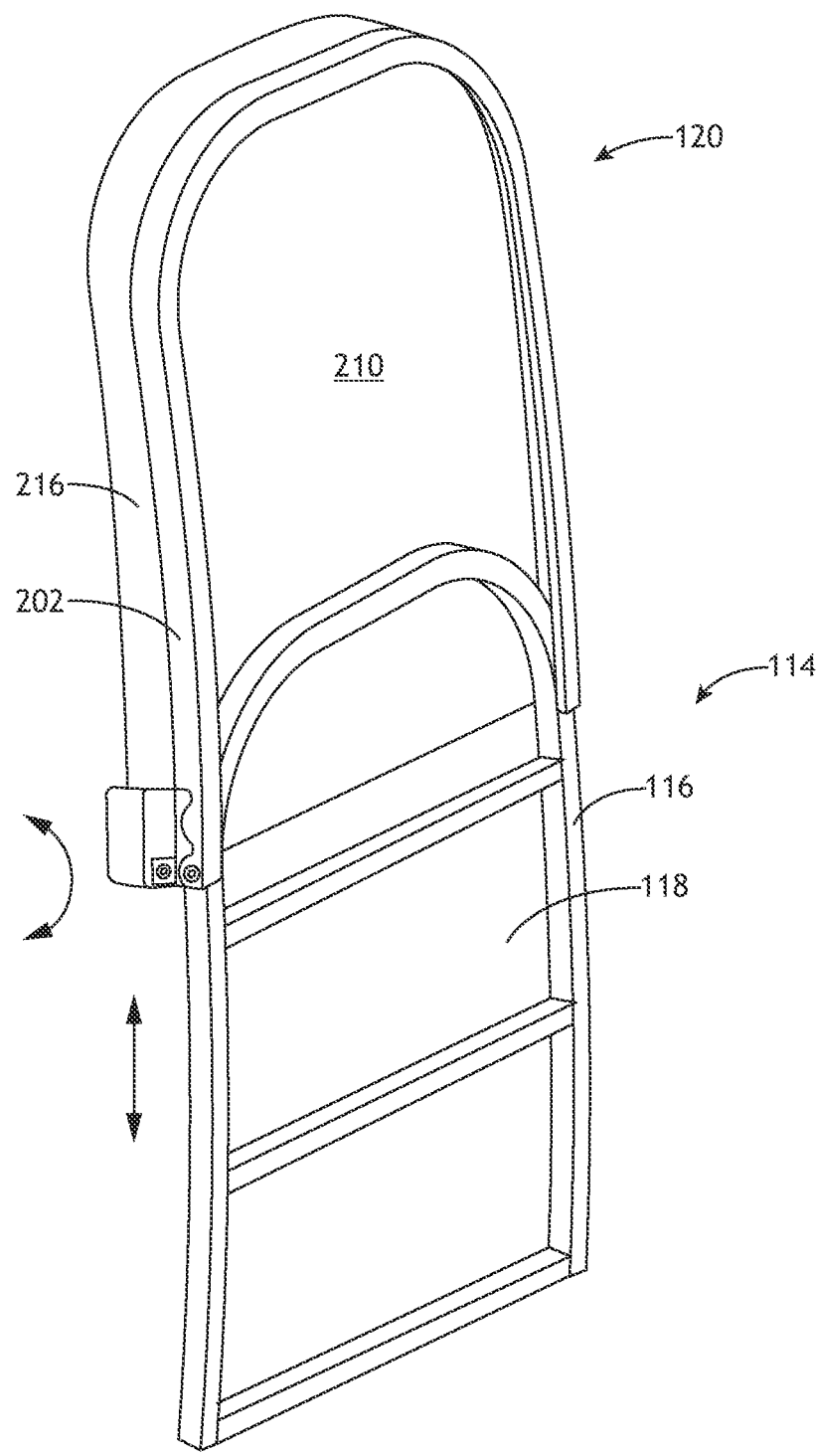
FIG. 6B illustrates a perspective view of an aircraft seat including a seatback cover attachment system, in accordance with one or more embodiments of the disclosure.
Figure 6C:
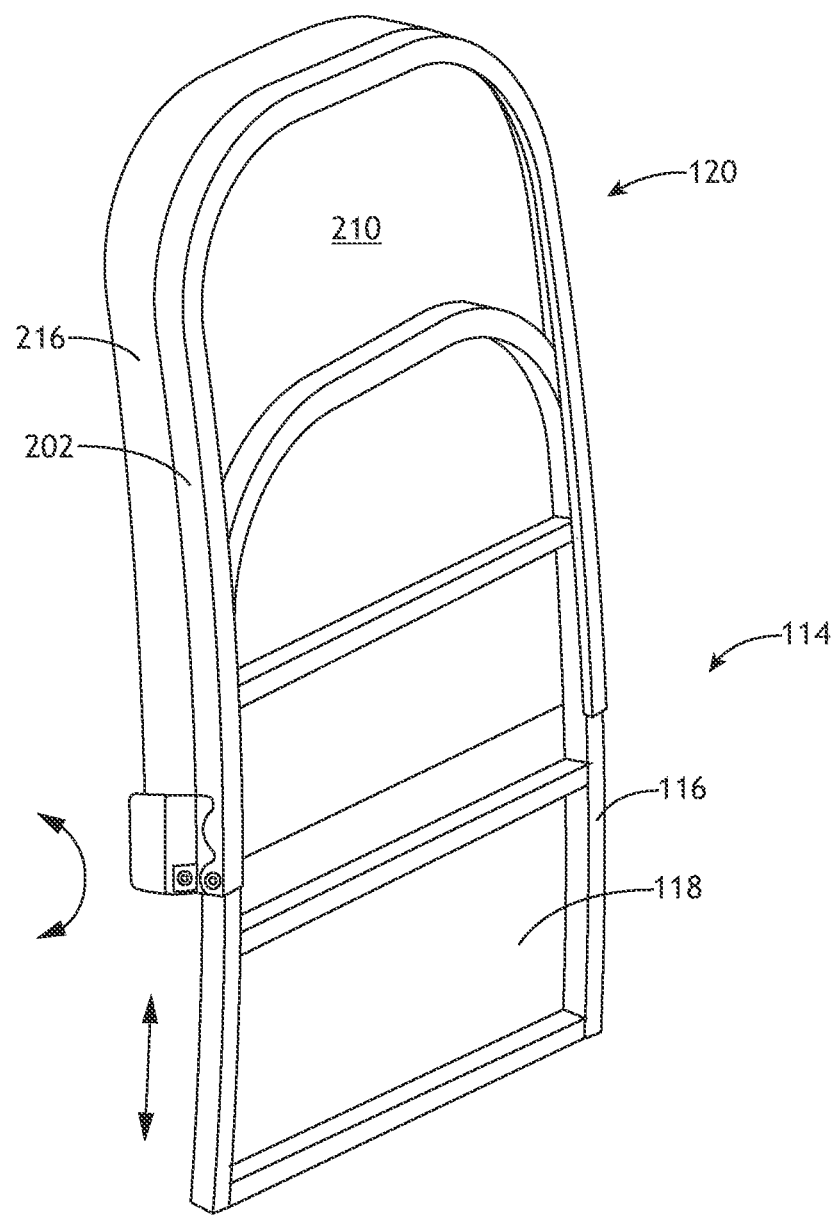
FIG. 6C illustrates a perspective view of an aircraft seat including a seatback cover attachment system, in accordance with one or more embodiments of the disclosure.
Figure 6D:
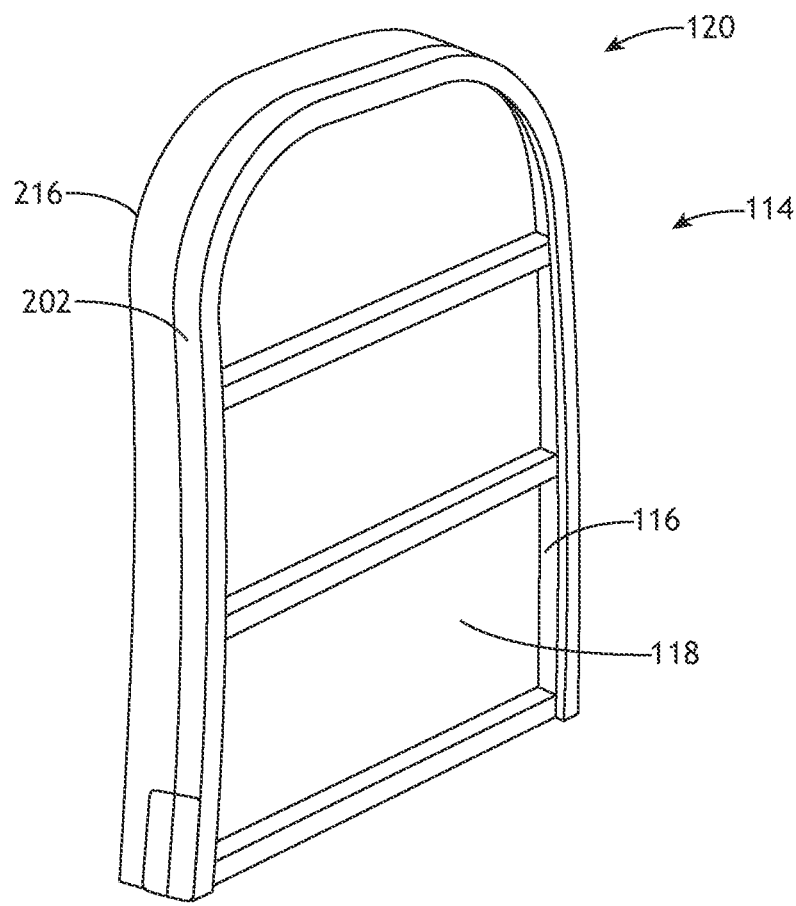
FIG. 6D illustrates a perspective view of an aircraft seat including a seatback cover attachment system, in accordance with one or more embodiments of the disclosure.

Referring to FIG. 4, the attachment system 120 may be configured to receive one or more seatback frame mounts. For example, the substrate 202 may include one or more seatback frame cut outs 400 configured to conform to one or more seatback frame mounts. In this regard, the one or more seatback frame cuts outs 400 may be configured to slide past the one or more seatback frame mounts, without interfering with the substrate 202, when the seatback frame 114 is inserted in the channel 206 of the substrate 202.

The attachment system 120 may include one or more side panel flaps 402 configured to visually hide the one or more seatback frame mounts and the one or more seatback frame cut outs 400. The one or more side panel flaps 402 may be coupled to the substrate 202 via one or more fastening assemblies 404. For example, the one or more side panel flaps 402 may include a snap 406 and the substrate 202 may include a receiving snap 408. In this regard, the one or more side panel flaps 402 may be coupled to the substrate 202 by fastening the snap 406 to the receiving snap 408. By way of another example, the one or more side panel flaps 402 may include a hook and loop fastening assembly including a loop portion coupled to the flap 402 and a hook portion coupled to the substrate 202. In this regard, the one or more side panel flaps 402 may be coupled to the substrate 202 by fastening the hook portion of the substrate 202 to the loop portion of the flap 402.

Installing an aircraft seatback using the seatback cover attachment system 120 may include one or more of the following steps of the method or process 700:

In a step 702, the seatback frame 114 may be inserted into a portion of the attachment system 120. For example, a portion of the one or more seatback frame elements 116 may be inserted at an angle 502 into the channel 206 of the substrate 202.

In a step 704, a force may be applied to engage the seatback frame 114 with the channel 206 until the attachment system 120 interlocks with the seatback frame 114. For example, the force may be applied through an application of force on the attachment system 120 in a specific direction until the attachment system 120 interlocks with the seatback frame 114. For instance, the force may be applied in a downward direction from the channel 206 of the substrate 202. In this regard, the force may be applied to engage the seatback frame 114 with the channel 206 until the substrate 202 snaps into place.

Figure 3C:
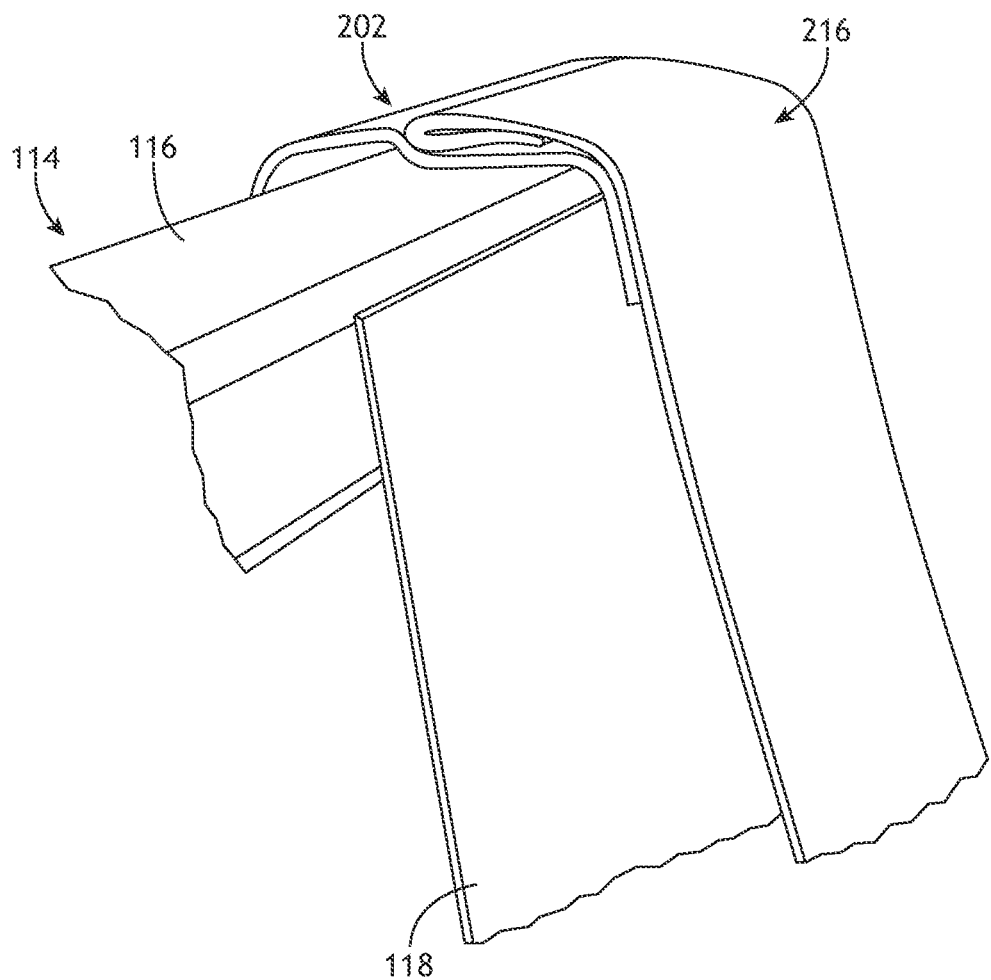
FIG. 3C illustrates a cross sectional view of the seatback cover attachment system, in accordance with one or more embodiments of the disclosure.
Figure 3D:
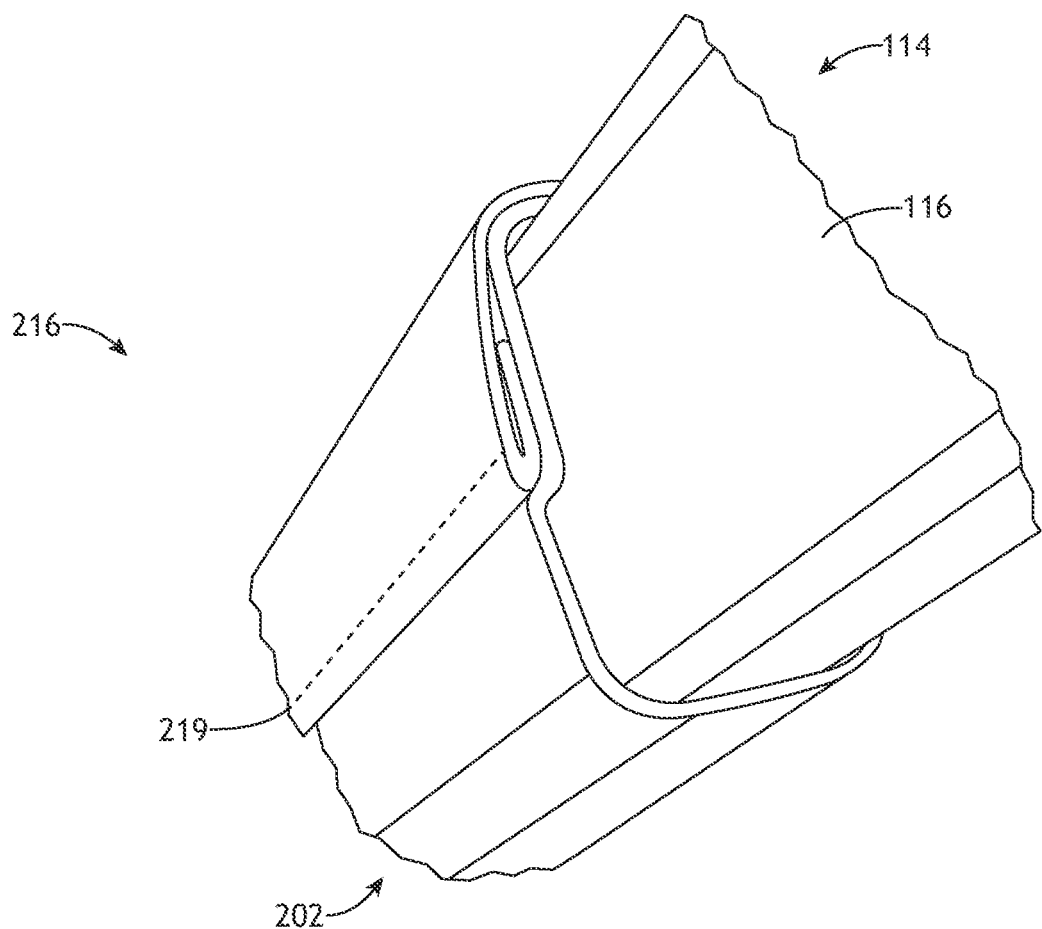
FIG. 3D illustrates a cross sectional view of the seatback cover attachment system, in accordance with one or more embodiments of the disclosure.

Referring to FIGS. 3C-3D, when the attachment system 120 engages with the seatback frame 114, the attachment system 120 may be configured to prevent the diaphragm 118 from cutting into the side panel 216. For example, the substrate 202 may be coupled to the side panel 216 such that a portion of the substrate 202 overlaps with a portion of the side panel 216. In this regard, the substrate 202 of the overlap is configured to prevent the diaphragm 118 from cutting into the side panel. In this regard, the attachment system 120 may be easily installed without removing the diaphragm 118 and/or damaging the diaphragm 118.

The attachment system 120 may interlock with the seatback frame 114 when a specific amount of force is applied. For example, the force may cause the substrate 202 to flex into place to cause the attachment system 120 to interlock with the seatback frame 114. In this regard, the attachment system 120 does not require an additional interlocking assembly to secure the attachment system 120 with seatback frame 114.

In an optional step 706, one or more side panel flaps may be coupled to a portion of the substrate 202 via one or more fastening assemblies. For example, as shown in FIGS. 4, 6A-6D, the attachment system 120 may include one or more side panel flaps 402 configured to visually hide the one or more seatback frame mounts and the one or more seatback frame cut outs 400. The one or more side panel flaps 402 may be coupled to the substrate 202 via one or more fastening assemblies 404. For example, the one or more side panel flaps 402 may include a snap 406 and the substrate 202 may include a receiving snap 408. In this regard, the one or more side panel flaps 402 may be coupled to the substrate 202 by fastening the snap 406 to the receiving snap 408. By way of another example, the one or more side panel flaps 402 may include a hook and loop fastening assembly including a loop portion coupled to the flap 402 and a hook portion coupled to the substrate 202. In this regard, the one or more side panel flaps 402 may be coupled to the substrate 202 by fastening the hook portion of the substrate 202 to the loop portion of the flap 402.

Removing the attachment system 120 may include one or more of the following steps of the method or process 800:

In an optional step 802, one or more side panel flaps may be un-coupled from a portion of the substrate 202 via one or more fastening assemblies. For example, as shown in FIGS. 4, 6A-6E, the attachment system 120 may include one or more side panel flaps 402 configured to visually hide the one or more seatback frame mounts and the one or more seatback frame cut outs 400. The one or more side panel flaps 402 may be coupled to the substrate 202 via one or more fastening assemblies 404 when assembling the seat 100. The one or more side panel flaps 402 may then be un-coupled from the substrate 202 via the one or more fastening assemblies 404 when disassembling the seat 100. For example, the one or more side panel flaps 402 may include a snap 406 and the substrate 202 may include a receiving snap 408. In this regard, the one or more side panel flaps 402 may be coupled to the substrate 202 by fastening the snap 406 to the receiving snap 408 and later un-coupled via the snap 406 and receiving snap 408. By way of another example, the one or more side panel flaps 402 may include a hook and loop fastening assembly including a loop portion coupled to the flap 402 and a hook portion coupled to the substrate 202 and then later un-coupled via the hook and loop fastening assembly.

In a step 804, a force may be applied to disengage the seatback frame 114 and the channel 206. For example, the force may be applied through an application of force on the attachment system 120 in a specific direction to cause the attachment system 120 to disengage from the seatback frame 114. For instance, the force may be applied through an application of force in an upward direction from the channel 206 of the substrate 202. In this regard, the force may be applied to disengage the seatback frame 114 from the channel 206 until the substrate 202 un-snaps from the seatback frame 114.

Referring to FIGS. 3C-3D, when the attachment system 120 disengages with the seatback frame 114, the attachment system 120 may be configured to prevent the diaphragm 118 from cutting into the side panel 216. For example, the substrate 202 may be coupled to the side panel 216 such that a portion of the substrate 202 overlaps with a portion of the side panel 216. In this regard, the substrate 202 of the overlap is configured to prevent the diaphragm 118 from cutting into the side panel. In this regard, the attachment system 120 may be easily removed without removing the diaphragm 118 and/or damaging the diaphragm 118.

In a step 806, the seatback frame 114 may be removed from the channel of the substrate. For example, the seatback frame elements 116 of the seatback frame 114 may be removed from the channel 206 of the substrate 202 when the attachment system is fully disengaged with the frame 114.

It is noted herein the methods or processes 700, 800 is not limited to the steps and/or sub-steps provided. The methods or processes 700, 800 may include more or fewer steps and/or sub-steps. In addition, the methods or processes 700, 800 may perform the steps and/or sub-steps simultaneously. Further, the methods or processes 700, 800 may perform the steps and/or sub-steps sequentially, including in the order provided or an order other than provided. Therefore, the above description should not be interpreted as a limitation on the scope of the disclosure but merely an illustration.

Although embodiments of the disclosure illustrate coupling or uncoupling various components of the attachment system 120 from above as illustrated in at least FIGS. 5A-6D, it is noted herein various component of the attachment system 120 may be coupled or uncoupled from a front or rear direction with enough applied force. Therefore, the above description should not be interpreted as a limitation on the scope of the disclosure but merely an illustration.

It is noted herein the seatback cover attachment system 120 may be configured to work with any aircraft seat 100 and/or any set of components in the aircraft seat 100. For example, the seatback cover attachment system 120 may be configured to take into account any changes in shape of the components of the aircraft seat 100 (e.g., within an x-y plane forming a seating surface for an occupant), where the changes in shape may be caused by or otherwise dependent on the location of the aircraft seat 100 within the aircraft cabin.

Although embodiments of the disclosure illustrate the seatback cover attachment system 120 being integrated within the aircraft seat 100, it is noted herein, however, that the seatback cover attachment system 120 and/or components of the seatback cover attachment system 120 are not limited to the aviation environment and/or the aircraft components within the aviation environment. For example, the seatback cover attachment system 120 and/or components of the seatback cover attachment system 120 may be configured for any type of vehicle known in the art. For instance, the vehicle may be any air, space, land, or water-based personal equipment or vehicle; any air, space, land, or water-based commercial equipment or vehicle; any air, space, land, or water-based military equipment or vehicle known in the art. By way of another example, the seatback cover attachment system 120 and/or components of the seatback cover attachment system 120 may be configured for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A seatback cover attachment system comprising:
a substrate, the substrate configured to reversibly couple to a portion of a seatback frame, the substrate including one or more surfaces that define a channel, the channel configured to receive a portion of the seatback frame; and
a seatback cover sub-system, the seatback cover sub-system comprising:
a dress cover, the dress cover including a seatback cover layer and a seatback cushion layer, the seatback cushion layer being integrated with the seatback cover layer; and
a side panel, the side panel configured to couple to a portion of the substrate, the side panel configured to couple to one or more portions of the dress cover to form the seatback cover sub-system.

2. The seatback cover attachment system of claim 1, wherein the attachment system includes one or more seams to join the side panel directly to a portion of the substrate.

3. The seatback cover attachment system of claim 2, wherein the substrate includes a lowered portion and a raised portion on a surface of the substrate.

4. The seatback cover attachment system of claim 3, wherein the raised portion is dimensioned to obscure the one or more seams.

5. The seatback cover attachment system of claim 1, wherein the attachment system includes one or more seams to join the side panel to a portion of the dress cover.

6. The seatback cover attachment system of claim 1, wherein the substrate includes one or more seatback frame mount cut outs configured to conform to one or more seatback frame mounts of the seatback frame.

7. The seatback cover attachment system of claim 6, further comprising:
   one or more flaps including one or more fastening assemblies configured to visually hide the one or more seatback frame mounts.

8. The seatback cover attachment system of claim 1, wherein the substrate is formed of a thermoformed plastic or laminated fiberglass.

9. An aircraft seat, comprising:
   a support system including a seatback frame and a seat pan frame;
   a seat pan cover including at least one surface configured to conform to a corresponding surface of the support system; and
   a seatback cover attachment system, the seatback cover attachment system comprising:
      a substrate, the substrate configured to reversibly couple to a portion of the seatback frame, the substrate including one or more surfaces that define a channel, the channel configured to receive a portion of the seatback frame; and
      a seatback cover sub-system, the seatback cover sub-system comprising:
         a dress cover, the dress cover including a seatback cover layer and a seatback cushion layer, the seatback cushion layer being integrated with the seatback cover layer; and
         a side panel, the side panel configured to couple to a portion of the substrate, the side panel configured to couple to one or more portions of the dress cover to form the seatback cover sub-system,
      the seatback cover attachment system configured to secure the seatback cover sub-system to the seatback frame via the substrate.

10. The aircraft seat of claim 9, wherein the seatback frame is configured to fit within the channel of the seatback cover attachment system.

11. The aircraft seat of claim 10, wherein the seatback frame is configured be inserted in the channel of the seatback cover attachment system.

12. The aircraft seat of claim 9, wherein the seatback frame is configured to engage with the substrate via a force applied in a direction downward from the channel of the seatback cover attachment system.

13. The aircraft seat of claim 9, wherein the seatback frame is configured to disengage from the substrate via a force applied in a direction upward from the channel of the seatback cover attachment system.

14. The aircraft seat of claim 9, wherein the substrate and the side panel at least partially overlap to prevent a seatback diaphragm of the seatback frame from cutting into a portion of the side panel.

\* \* \* \* \*